(12) United States Patent
Collings et al.

(10) Patent No.: US 8,182,787 B2
(45) Date of Patent: *May 22, 2012

(54) SYSTEM AND PROCESS FOR PRODUCING HIGH-PRESSURE HYDROGEN

(75) Inventors: Michael Collings, Grand Forks, ND (US); Ted R. Aulich, Grand Forks, ND (US); Ronald C. Timpe, Grand Forks, ND (US); Michael J. Holmes, Thompson, ND (US)

(73) Assignee: Energy & Environmental Research Center Foundation, Grand Forks, ND (US)

(*) Notice: Subject to any disclaimer, the term of this patent is extended or adjusted under 35 U.S.C. 154(b) by 405 days.

This patent is subject to a terminal disclaimer.

(21) Appl. No.: 12/492,071

(22) Filed: Jun. 25, 2009

(65) Prior Publication Data

US 2010/0068571 A1  Mar. 18, 2010

Related U.S. Application Data

(63) Continuation-in-part of application No. 10/553,531, filed as application No. PCT/US2004/011576 on Apr. 15, 2004, now Pat. No. 7,553,475.

(60) Provisional application No. 60/463,465, filed on Apr. 16, 2003.

(51) Int. Cl.
  *C01B 3/02* (2006.01)
  *C01B 3/04* (2006.01)
  *C01B 3/22* (2006.01)
  *C01B 3/26* (2006.01)

(52) U.S. Cl. .......... 423/648.1; 423/650; 423/651; 423/652; 423/653; 423/654

(58) Field of Classification Search ............. 423/648.1, 423/652, 653, 654, 650, 651
See application file for complete search history.

(56) References Cited

U.S. PATENT DOCUMENTS 6,284,157 B1 *  9/2001  Eliasson et al. ............ 252/373
7,553,475 B2 *  6/2009  Timpe et al. ............ 423/648.1

FOREIGN PATENT DOCUMENTS

EP        0303438    *  2/1989
WO   WO-2004103894 A1   12/2004

* cited by examiner

*Primary Examiner* — Wayne Langel
(74) *Attorney, Agent, or Firm* — Schwegman, Lundberg & Woessner, P.A.

(57) ABSTRACT

A method and apparatus are provided for use in producing high-pressure hydrogen from natural gas, methanol, ethanol, or other fossil fuel-derived and renewable hydrocarbon resources. The process can produce hydrogen at pressures ranging from 2000 to 12,000 pounds per square inch (psi) using a hydrogen carrier, with or without high-pressure water, and an appropriate catalyst. The catalyst reacts with the hydrogen carrier and, optionally, high-pressure water, in a catalytic reformer (20) maintained under desired temperature and pressure conditions.

57 Claims, 8 Drawing Sheets

High-Pressure Hydrogen from Natural Gas—Product Gas Composition

| Sample | Continuous 1 | Batch 1 | Batch 2 | Batch 3 |
|---|---|---|---|---|
| Hydrogen, mol% | 19.3 | 19.9 | 16.9 | 16.4 |
| Carbon Dioxide, mol% | 7.6 | 8.6 | 5.1 | 6.3 |
| Methane, mol% | 72.6 | 70.1 | 76.6 | 75.7 |
| Ethane, mol% | 0.4 | 1.1 | 1.2 | 1.4 |
| Propane, mol% | 0.0 | 0.3 | 0.0 | 0.1 |
| cis-2-Butene, mol% | 0.0 | 0.0 | 0.0 | 0.0 |
| Carbon Monoxide, mol%* | 0.0 | 0.0 | 0.0 | 0.0 |

* Analytical detection limit for carbon monoxide was 100 ppm.

FIG. 4

High-Pressure Hydrogen from Methanol—Product Gas Composition

| Sample | Continuous 1 | Continuous 2 | Batch 1 | Batch 2 |
|---|---|---|---|---|
| Hydrogen, mol% | 65.1 | 66.4 | 72.4 | 69.7 |
| Carbon Dioxide, mol% | 23.9 | 23.8 | 16.8 | 17.1 |
| Methane, mol% | 6.5 | 5.4 | 4.9 | 7.6 |
| Ethane, mol% | 0.1 | 0.1 | 0.1 | 0.0 |
| Propane, mol% | 0.0 | 0.0 | 0.0 | 0.0 |
| cis-2-Butene, mol% | 0.1 | 0.1 | 0.5 | 0.4 |
| Carbon Monoxide, mol% | 4.3 | 4.2 | 5.4 | 5.2 |

SYSTEM AND PROCESS FOR PRODUCING HIGH-PRESSURE HYDROGEN

CROSS REFERENCE TO RELATED APPLICATIONS

This application is a CIP of commonly owned U.S. patent application Ser. No. 10/553,531, filed on Oct. 14, 2005, entitled "SYSTEM AND PROCESS FOR PRODUCING HIGH-PRESSURE HYDROGEN," now issued as U.S. Pat. No. 7,553,475, which is a US national stage application of co-pending commonly owned PCT application number PCT/US04/11576, filed on Apr. 15, 2004, entitled "SYSTEM AND PROCESS FOR PRODUCING HIGH-PRESSURE HYDROGEN," which claims priority to U.S. provisional patent application No. 60/463,465, filed Apr. 16, 2003, entitled "PROCESS FOR PRODUCING HIGH-PRESSURE HYDROGEN," both of which are incorporated by reference herein in their entireties.

"This invention was made with U.S. Government support under Cooperative Agreement No. W9132T-08-2-0014 awarded by the U.S. Army Construction Engineering Research Laboratory. The Government has certain rights in this invention."

FIELD OF THE INVENTION

This invention relates to the field of hydrogen production. In particular, this invention is drawn to a system and method of producing high-pressure hydrogen on-demand, using a catalytic reformer under high-pressure conditions.

BACKGROUND OF THE INVENTION

There are numerous proposals to transition from the current fossil fuel-based transportation systems to what is known as the "hydrogen economy." A hydrogen economy would use vehicles powered by fuel cells, or hydrogen-burning internal combustion engines (ICEs), in place of gasoline- or diesel-powered vehicles. However, several problems must be overcome in order to make a hydrogen economy economically and technically feasible. One problem is a lack of an economically viable means of supplying fuel cell-quality hydrogen. Typical fuel cells require a relatively pure form of hydrogen, which makes the hydrogen production more difficult and costly. Another problem relates to hydrogen storage and transportation. To make a hydrogen-powered vehicle practical, hydrogen is stored in one or more tanks under high-pressure. Because of its small molecular size, hydrogen is much more difficult and expensive to compress than natural gas, for example. Typical prior art hydrogen production techniques require the costly step of pressurizing the hydrogen after it is produced.

When a hydrogen-powered vehicle is supplied with fuel, there are two basic options. A first supply option is on-board vehicle extraction of hydrogen from hydrocarbon fuels. A second option is on-board vehicle storage of hydrogen produced and dispensed at a stationary facility. Within these two basic options, numerous specific variations are being studied and/or developed, including, but not limited to, 1) on-board vehicle extraction of hydrogen from gasoline, diesel fuel, naphtha, and methanol; 2) fuel station site hydrogen production via steam methane (natural gas) reforming (SMR) or other hydrocarbon-based processes; 3) fuel station site hydrogen production via electrolysis of water; 4) centrally produced (via large-scale SMR, electrolysis, and other processes) hydrogen delivered to a fuel station by truck or pipeline; and 5) other supply scenarios involving hydrogen production via photochemical, gasification, nuclear, biomass-based, biological, and solar-powered, wind-powered, and hydro-powered methods.

SMR is the most common and least expensive prior art method of hydrogen production, accounting for about 95% of the hydrogen produced in the United States. In SMR, methane is reacted with steam to produce a mixture of hydrogen, carbon dioxide, carbon monoxide, and water, and the mixture is separated to yield high-purity hydrogen. Because of its status as a mature, reliable, economically viable technology, major industrial companies are developing hydrogen vehicle refueling station concepts based on the use of on-site SMR. These concepts involve scaling the process down significantly from its most common commercial application of producing hydrogen at petroleum refineries for use in making cleaner-burning gasoline. Challenges associated with on-site hydrogen generation derive from the unpredictable demands of vehicle fueling. Because SMR works best at a steady-state, 24-hours-a-day, full-capacity operation, integration with a hydrogen fuel station will require costly on-site hydrogen compression and storage (as a gas, a liquid, or in a chemical compound) to compensate for fluctuating hydrogen demand. None of the hydrogen storage technologies available today represents an ideal combination of economy, performance, durability, and safety.

Various prior art methods are available for producing a useful gas or for generating gases from the process of breaking down waste products. For example, as mentioned above, SMR is the most common prior art method of producing hydrogen. Typically, SMR is performed at temperatures in the range of 700°-1000° C. and at pressures in the range of 30-735 psi. Processes that require a high temperature are less desirable since more energy is expended during the process. Similarly, typical prior art processes that produce hydrogen have the disadvantage of requiring pressurization after the hydrogen is produced, since vehicle-fuel hydrogen must be compressed to enable sufficient fuel for a desirable range (e.g., 300 miles).

It can be seen that there is a need for techniques for producing hydrogen on-demand in an economical manner. There is also a need for techniques that produce hydrogen at high pressures, reducing or eliminating the need for the costly step of pressurizing hydrogen after it is produced.

SUMMARY OF THE INVENTION

An apparatus and method are provided for producing high-pressure hydrogen on-demand. The invention uses a mixture of hydrocarbon carrier with or without high-pressure water exposed to a catalyst under high-pressure conditions to produce high-pressure hydrogen. In one embodiment, carbon dioxide that is produced can be separated and recovered for sequestration or other utilization options. In another example, the apparatus can be integrated with a fuel cell to provide hydrogen to the fuel cell, while the fuel cell provides heat to help maintain desired conditions in the hydrogen production reactor.

Other features and advantages of the present invention will be apparent from the accompanying drawings and from the detailed description that follows below.

BRIEF DESCRIPTION OF THE FIGURES

The present invention is illustrated by way of example and is not limited by the figures, in which like references indicate similar elements and in which.

DETAILED DESCRIPTION

Generally, the present invention offers an apparatus and method of economically producing high-pressure hydrogen, thereby eliminating the need for expensive hydrogen compression. In addition, the present invention can be used for on-demand production of high-pressure hydrogen, which results in greatly diminished hydrogen storage volume requirements compared to other systems, such as SMR and other demand-unresponsive processes. The present invention can produce high-pressure hydrogen from natural gas, methanol, ethanol, and other fossil fuel-derived and renewable hydrocarbon resources, including oxygen- and nitrogen-containing hydrocarbons. The process can produce hydrogen at pressures ranging from 2000 to 12,000 pounds per square inch (psi) using a hydrogen carrier, with or without water, and a catalyst under high-pressure, moderate-temperature reaction conditions. Note that this pressure range is only one example and that higher pressures could also be used. In one example, when either natural gas or methanol is used as the hydrogen carrier, the process described below yields gaseous products with hydrogen concentrations of up to 19 mole percent (mol %) and 66 mol %, respectively. Note that neither of these concentrations is meant to be the limit expected under optimal conditions. With methanol as the hydrogen carrier, nonhydrogen product gas constituents may include carbon dioxide, carbon monoxide, methane, and ethane. With methane as the hydrogen carrier, nonhydrogen product gas constituents may include methane, oxygen, and ethane, with no detectable carbon monoxide.

The production of hydrogen using the present invention is based on the reactions between hydrocarbons such as in the following examples:

$$CH_4 + 2H_2O \rightarrow 4H_2 + CO_2$$

$$CH_3OH + H_2O \rightarrow 3H_2 + CO_2$$

$$C_2H_5OH + 3H_2O \rightarrow 6H_2 + 2CO_2$$

In the practice described below, the hydrocarbon is fed into the system at high-pressure and is heated prior to and while contacting a catalyst to produce hydrogen gas, all the while maintaining high-pressure. The gas stream exits the reactor where excess water and CO$_2$ are condensed and removed to yield a purer hydrogen product.

In addition, the present invention may also be utilized for the following reaction path for material of the general formula C$_x$H$_y$O$_x$ such as methanol, ethylene glycol, or glycerol and eliminating the use of high-pressure water:

$$CH_3OH \rightarrow 2H_2 + CO$$

$$CH_2(OH)CH_2(OH) \rightarrow 3H_2 + 2CO$$

$$CH_2(OH)CH(OH)CH_2(OH) \rightarrow 4H_2 + 3CO$$

This waterless process for producing hydrogen can also be applied to hydrogen carriers such as ammonia, ammonium carbonate, and urea:

$$2NH_3 \rightarrow 3H_2 + N_2$$

$$NH_2C(O)NH_2 \rightarrow 2H_2 + N_2 + CO$$

$$(NH_4)_2CO_3 \rightarrow 2H_2 + N_2 + CO + 2H_2O$$

Additionally, the present invention could also be utilized for the following reaction path for methanol by eliminating the use of high-pressure water:

$$CH_3OH \rightarrow 2H_2 + CO$$

In this case, the overall complexity and energy costs are reduced by eliminating high-pressure water pumping and heating, although less hydrogen is produced.

The present invention has many uses. One application of the invention is for on-demand production of high-pressure hydrogen for fuel cells, including proton exchange membrane (PEM) fuel cells used for powering transportation vehicles, as well as PEM and other fuel cells used for other mobile and stationary power production purposes. Utilizing the invention for PEM fuel cell applications may require integration with a hydrogen purification technology, since PEM fuel cells require low-contaminant-level hydrogen for trouble-free operation and maximum power density. Examples of a hydrogen purification technology that may be used are described in U.S. Pat. No. 5,912,424, issued on Jun. 15, 1999, entitled "Electrical Swing Adsorption Gas Storage and Delivery System" and U.S. Pat. No. 5,972,077, issued on Oct. 26, 1999, entitled "Gas Separation Device Based on Electrical Swing Adsorption," both of which are incorporated herein by reference. When integrated with a hydrogen purification technology, this invention holds significant advantages over other technologies being pursued for producing hydrogen for fuel cell vehicles. One advantage is the elimination of the need for expensive hydrogen compression. Another advantage is a significant reduction of the need for expensive storage of high-pressure hydrogen. Following is a more detailed description of the invention. The present invention can also be used to fill hydrogen cylinders or tanks for various uses.

The present invention is similar to SMR in that both processes can involve the use of natural gas as a hydrogen carrier, water as a reactant, and a catalyst to promote methane reforming to hydrogen and carbon dioxide. However, there are several distinctions between the two processes. One distinction is the range of temperatures and pressures utilized in the reforming reaction. In the present invention, if high-pressure water is used, the reactor is maintained within temperature and pressure ranges of approximately 375°-640° C. and 2000-12,000 psi, respectively. In contrast, SMR utilizes reaction temperatures and pressures ranging from about 700°-1000° C. and 30-735 psi, respectively. This does not achieve energy efficient results. Another distinction is that the present invention can be utilized with hydrogen carriers other than natural gas/methane, including, but not limited to, propane, butane, methanol, and ethanol. In one example, if high-pressure water is not used as a reactant in the present invention, then the reactor temperature may be as low as the decomposition temperature of the hydrogen carrier and a pressure range of approximately 2000-12,000 psi to minimize the potential for occurrence of the carbon formation reaction. For example, the ideal reactor temperature for hydrogen carriers such as glycerol will likely be about 290° C., the approximate decomposition temperature of glycerol.

Figure 1:
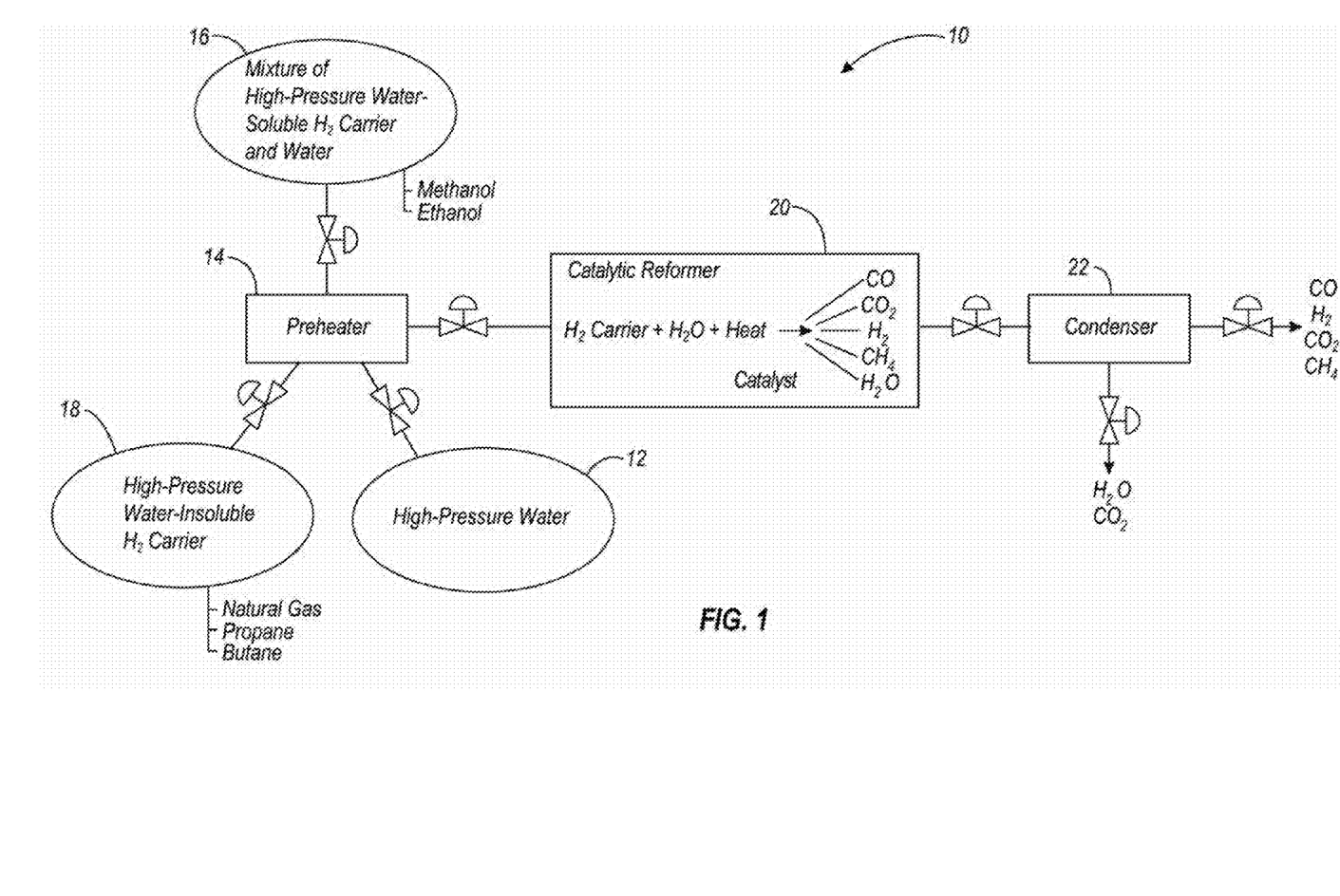
FIG. 1 is a schematic diagram of a reactor system which may be used with the present invention.

FIG. 1 shows one example of an apparatus and method of the present invention. FIG. 1 is a schematic diagram of a reactor system 10 which may be used with the present invention. As outlined in FIG. 1, the reactor system 10 can be configured to extract hydrogen from a liquid or gaseous, water-soluble or water-insoluble hydrogen carrier. Note that other variations are also possible within the scope of the present invention. FIG. 1 shows a source of high-pressure water 12 connected to a preheater 14 via a control valve. In one example, the high-pressure water is pressurized to a pressure of approximately 2000 to 12,000 psi. At least one hydrogen carrier is also connected to the preheater 14. FIG. 1 shows two hydrogen carrier sources. A first hydrogen carrier source 16 is illustrated for water-soluble hydrogen carriers. The hydrogen carrier source 16 supplies a mixture of high-pressure water-soluble hydrogen carrier and water to the preheater 14 via a control valve. In one example, this mixture is pressurized to a pressure of approximately 2000 to 12,000 psi. Examples of water-soluble hydrogen carriers include methanol and ethanol. A second hydrogen carrier source 18 is illustrated for hydrogen carriers that are water-insoluble under temperature and pressure conditions below the critical point of water. The hydrogen carrier source 18 supplies a high-pressure water-insoluble hydrogen carrier to the preheater 14 via a control valve. In one example, this mixture is pressurized to a pressure of approximately 2000 to 12,000 psi. Examples of water-insoluble hydrogen carriers include natural gas, propane, and butane. Note that while FIG. 1 illustrates two possible hydrogen carrier sources, the system shown in FIG. 1 needs only one hydrogen carrier source. The hydrogen carrier sources shown in FIG. 1 can take any desired form. In one example, a hydrogen carrier source can be a storage tank. In another example, the hydrogen carrier source can come from a pipeline or other fuel supply.

The preheater 14 is connected to a catalytic reformer 20 via a control valve. After the preheater 14 heats a mixture to of high-pressure hydrogen carrier and water, the control valve is opened, allowing the mixture to flow into the catalytic reformer 20, which also contains a catalyst. The catalytic reformer 20 can comprise a tubular reactor capable of high-pressure, moderate-temperature operation in the presence of gas with a high content of molecular hydrogen. For example, the reformer used in the process development work described below comprised a thick-walled tubular reactor fabricated from 316 stainless steel, equipped with high-pressure manually operated valves. The catalytic reformer 20 is connected to a condenser 22 via a control valve. The reaction that takes place in the catalytic reformer 20 (described below) results in a number of product gases, depending on the hydrogen carrier and catalyst used. These product gases flow into the condenser, which separates the product gases, including high-pressure hydrogen. The hydrogen content of the product gas stream is increased by utilizing CO and water to produce hydrogen via the water-gas shift reaction.

The system shown in FIG. 1 can be operated in various ways. Following are some examples. When natural gas or another water-insoluble hydrogen carrier (e.g., hydrogen carrier source 18 in FIG. 1) is used, high-pressure water and the natural gas or other water-insoluble hydrogen carrier are separately injected into the preheater 14 at a desired water-to-hydrogen carrier molar ratio. Tests conducted to date have utilized water-to-hydrogen carrier molar ratios ranging from 0.1:1 to 10:1. In general, for water-based reforming of any hydrogen carrier, utilization of a water-to-hydrogen carrier molar ratio of at least 1:1 ensures availability of sufficient oxygen to guard against undesired carbon buildup on catalyst used to promote the reforming reaction. However, minimal usage of high-pressure water is desirable to minimize process energy input, and lower water-to-hydrogen carrier molar ratios may be achievable with improved reforming catalysts. Following mixing and heating in the preheater 14, the reactant mixture flows into the reformer 20, which, in one example, comprises a tubular reactor containing a commercially available reforming catalyst. The process is compatible with continuous-flow operation, and residence time in the reformer is a function of pressure and flow rate through the reformer. The residence time in the reformer using the present invention may be in the range of 0.5 to 360 seconds, in one example.

Figure 2:
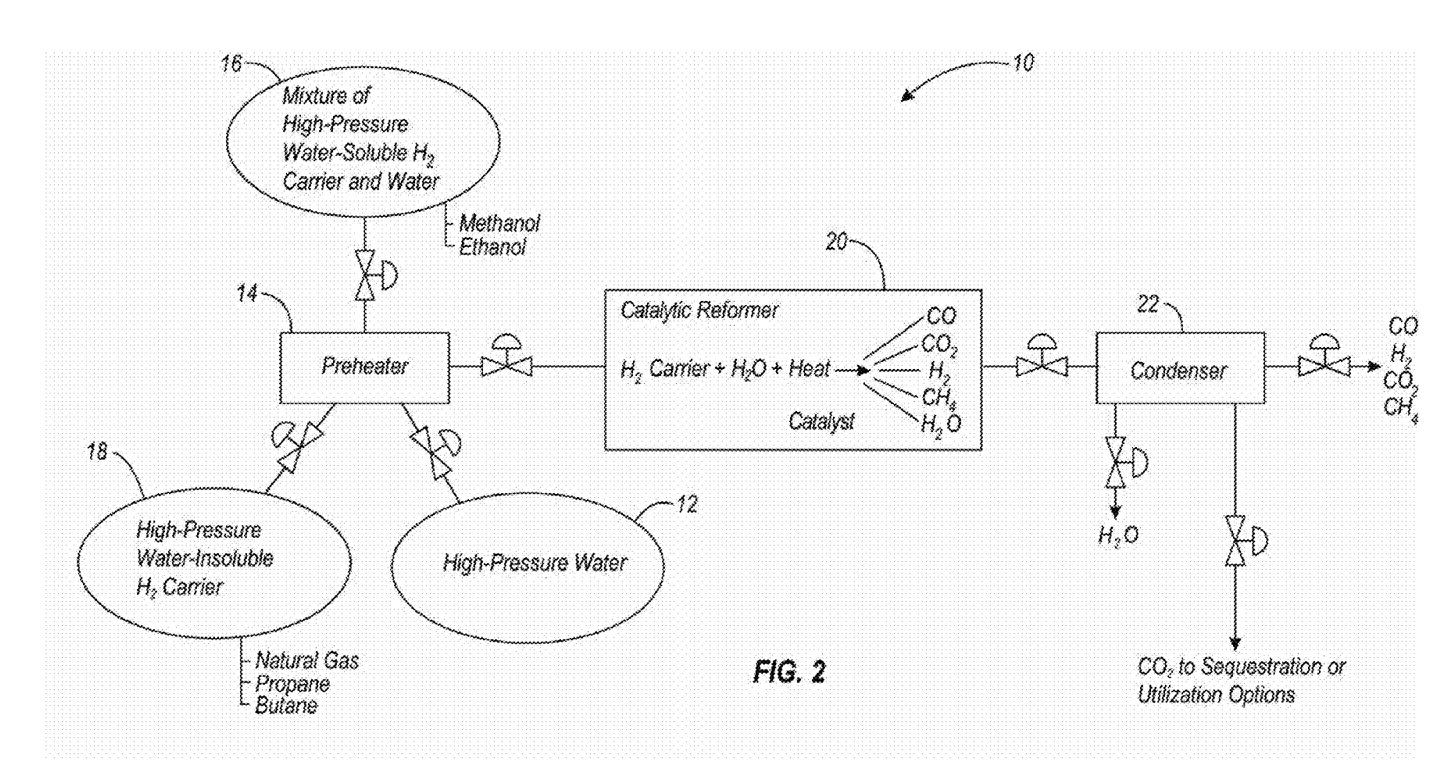
FIG. 2 is a schematic diagram of a reactor system showing CO$_2$ separation and recovery.

Reformate products (e.g., $CO$, $CO_2$, $H_2$, $CH_4$, $H_2O$) exit the reformer 20 and flow into the condenser 22, in which water and a portion of the carbon dioxide product are condensed. Pressure in the condenser and pressure of the product gas stream exiting the condenser 22 can be maintained at or near pressure in the reformer (or lower, if desired) by adjustment of the control valve at the condenser exit. The product gases exiting the condenser 22 (e.g., $CO$, $H_2$, $CO_2$, $CH_4$) can be used directly, depending on the concentrations of the product gases and depending on the application. For some applications (including solid oxide fuel cells), it may be desirable to feed the product gas mixture directly. Other applications may require treating the product gas stream with a hydrogen purification technology, such as mentioned above. Also, the $CO_2$ gas can be recovered for sequestration or another utilization option. FIG. 2 is a schematic diagram of a reactor system 10 similar to that shown in FIG. 1, except that the $CO_2$ gas is shown to be separated and recovered for sequestration or other utilization option.

When methanol or another water-soluble hydrogen carrier (e.g., hydrogen carrier source 16 in FIG. 1) is used, a mixture of methanol (or other water-insoluble hydrogen carrier) and water is pressurized and injected into the preheater 14 at a desired water-to-hydrogen carrier molar ratio. From the preheater 14 on downstream through the reactor system, the process steps and conditions are the same to those utilized for natural gas (described above).

Figure 3:
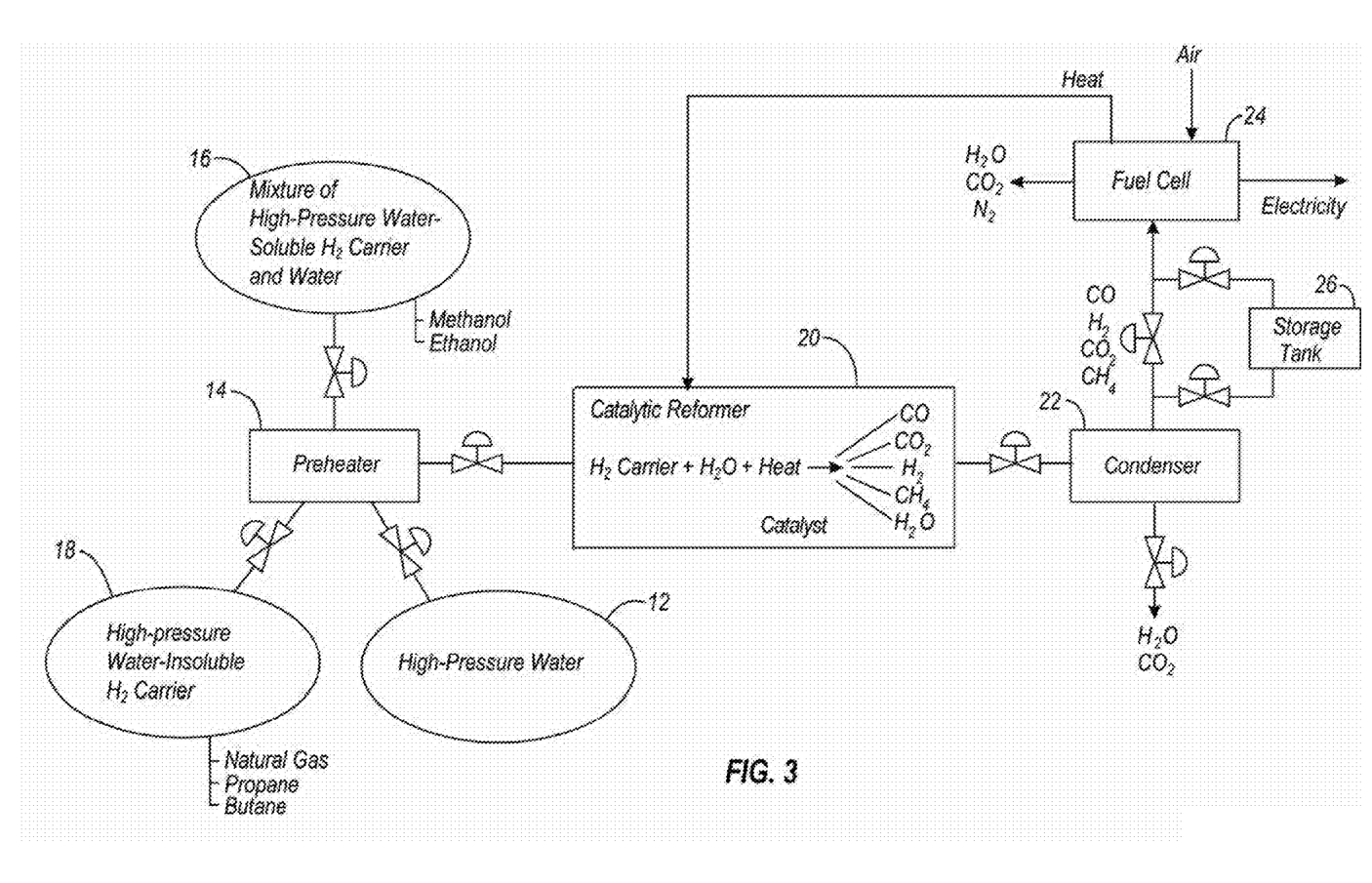
FIG. 3 is a schematic diagram of a reactor system integrated with a fuel cell.

One use of the present invention is to provide fuel to a fuel cell. FIG. 3 is a schematic diagram of a reactor system similar to those described above, with the addition of a fuel cell. Like FIGS. 1 and 2, FIG. 3 shows a preheater 14, catalytic reformer 20, condenser 22, a source of high-pressure water 12, and sources of hydrogen carriers 16 and 18. The hydrogen separated by the condenser 22 is provided to a fuel cell 24, which converts hydrogen to electricity. A storage tank 26 can be used to store hydrogen that is produced in excess of what is used by the fuel cell 24. If desired, the hydrogen from the condenser 22 can be further purified. In this example, heat generated by the fuel cell is used to help heat the catalytic reformer 20, which increases the efficiency of the system, since less external energy is needed to heat the reformer 20 to a desired temperature.

Following are descriptions of two examples of hydrogen production using the present invention, including the product gas composition for each example. In a first example, hydrogen is produced from natural gas using a system such as the system shown in FIG. 1. In this example, natural gas is injected into the preheater 14, along with high-pressure water. In one example, the natural gas and water are at a pressure in the range of 2000 to 12,000 psi. The preheater 14 heats the mixture, which flows into the catalytic reformer 20. In the reformer 20, the mixture is maintained at 375°-640° C. and 2000 to 12,000 psi. In the reformer 20, the mixture reacts with a catalyst to produce product gases, which are at least partially separated by the condenser 22. The resulting gases include hydrogen, carbon dioxide, methane, ethane, and propane.

Figure 4:
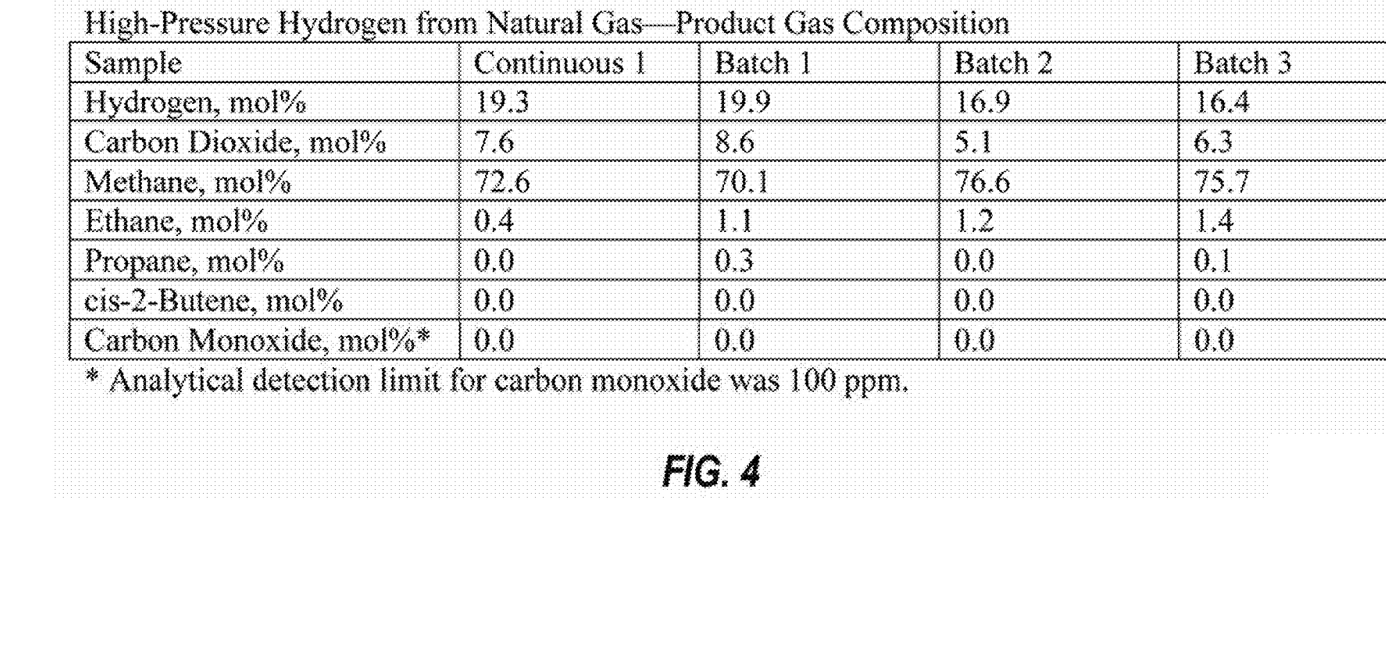
FIG. 4 is a table presenting compositional data on four different product gas samples collected during a series of tests utilizing natural gas as the hydrogen carrier.

FIG. 4 is a table presenting compositional data on four different product gas samples collected during a series of tests utilizing natural gas/methane as the hydrogen carrier. Each of these tests employed an approximate 4:1 water-to-methane molar ratio and a reformer temperature and pressure of about 440° C. and 3500 psi, respectively. The first column of data in FIG. 4 is for a sample of data collected from a continuous-process test in which residence time in the reformer was about 2 seconds. The three remaining data sets are for tests in which reformer residence time was increased by operating the reactor system in batch mode, with the objective of investigating the effect of residence time on product gas composition. Estimated residence times for Batch 1-3 tests were about 3, 10, and 15 minutes, respectively. The batch test results indicate that (under the conditions evaluated) residence time has no significant effect on product gas composition. Of primary interest in the natural gas results is the consistent absence of carbon monoxide in the product gas. With the gas chromatography-based analytical procedure employed for product gas characterization, the detection limit for carbon monoxide is about 100 parts per million (ppm), which means that if carbon monoxide is present in the product gas, it is present at a concentration of below 100 ppm. Carbon monoxide is one of two contaminants of major concern regarding hydrogen for PEM fuel cell applications (the other being sulfur species), which means that its absence from the product gas stream represents a significant process advantage over prior art technologies.

Figure 5:
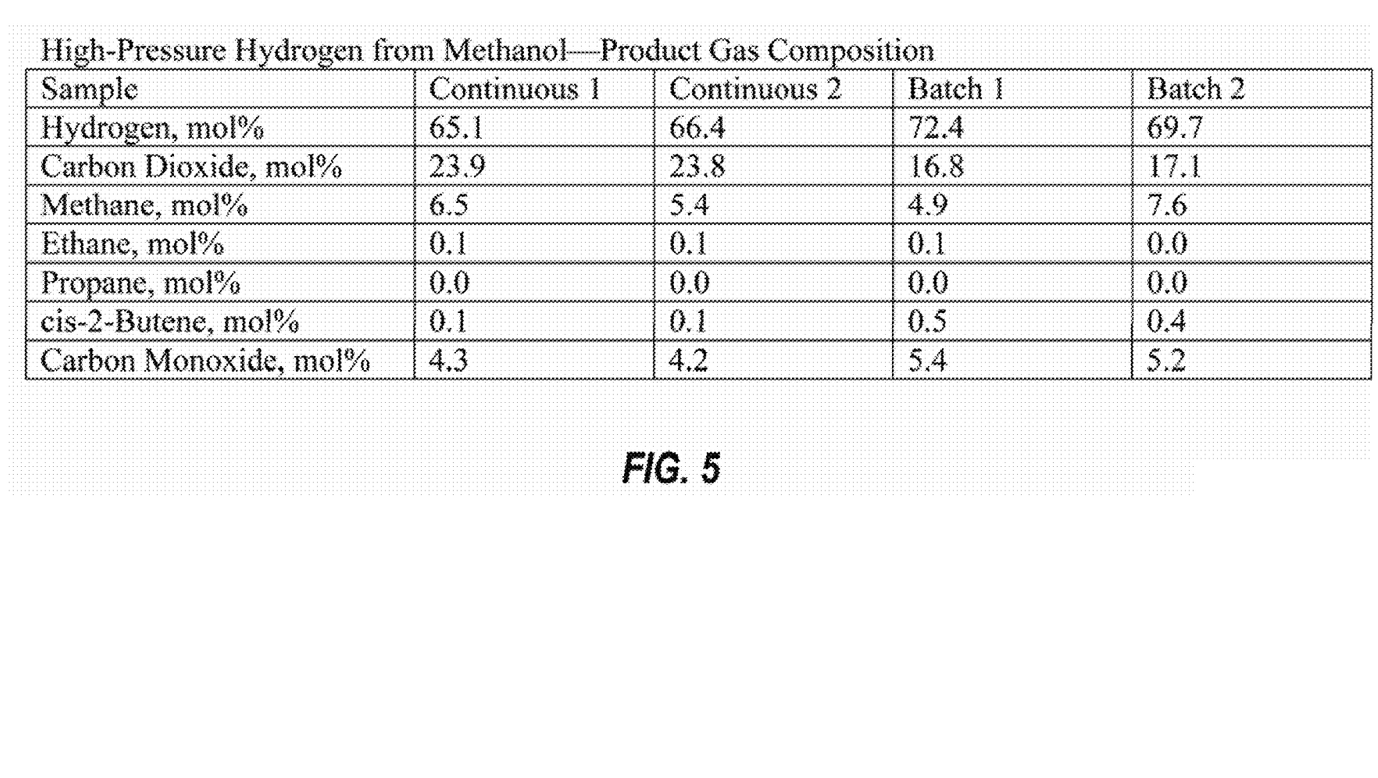
FIG. 5 is a table presenting compositional data on four different product gas samples collected during a series of tests utilizing methanol as the hydrogen carrier.

FIG. 5 presents compositional data on four different product gas samples collected during a series of tests utilizing methanol as a hydrogen carrier. Each of these tests employed an approximate 1:1 water-to-methanol molar ratio and a reformer temperature and pressure of about 380° C. and 3200 psi, respectively. The first two data columns are for samples collected from continuous-process tests in which residence time in the reformer was about 2 seconds. The two remaining data sets are for tests in which reformer residence time was increased by operating the reactor system in batch mode, with the objective of investigating the effect of residence time on product gas composition. Estimated residence times for the Batch 1 and 2 tests were about 3 to 5 minutes. The batch test results indicate that (under the conditions evaluated) residence time has a measurable effect on product gas composition, most significantly on level of hydrogen and carbon dioxide.

The present invention described above can take on many forms and include various alternatives. For example, various types and combinations of hydrogen carriers can be used. Suitable hydrogen carriers may include hydrocarbon, oxygen-containing hydrocarbons, or nitrogen-containing hydrocarbons. Examples of hydrogen carriers that can be used with the present invention include, but are not limited to, methane, natural gas, methanol or other alcohol, ethylene glycol, glycerol, ethanol, propane, butane, naphtha, ammonia, ammonium carbonate, urea, natural gas condensate liquids or natural gasoline, military-specification turbine fuel, commercial turbine fuel, diesel fuel, kerosene, other liquid or gaseous materials, and combinations thereof.

Examples of catalysts that may be used with the present invention include nickel and/or nickel oxide with or without copper on carrier/support. In another example, the catalyst may be nickel oxide with or without lanthanum oxide, with or without potassium oxide, on carrier/support. In another example, the catalyst may be platinum, rhodium, cobalt, palladium, and/or ruthenium alone or in combinations on carrier/support. One example of a suitable catalyst is a nickel-nickel oxide catalyst manufactured by Sud-Chemie Inc., referred to as No. FCR-HC29.

Figure 6:
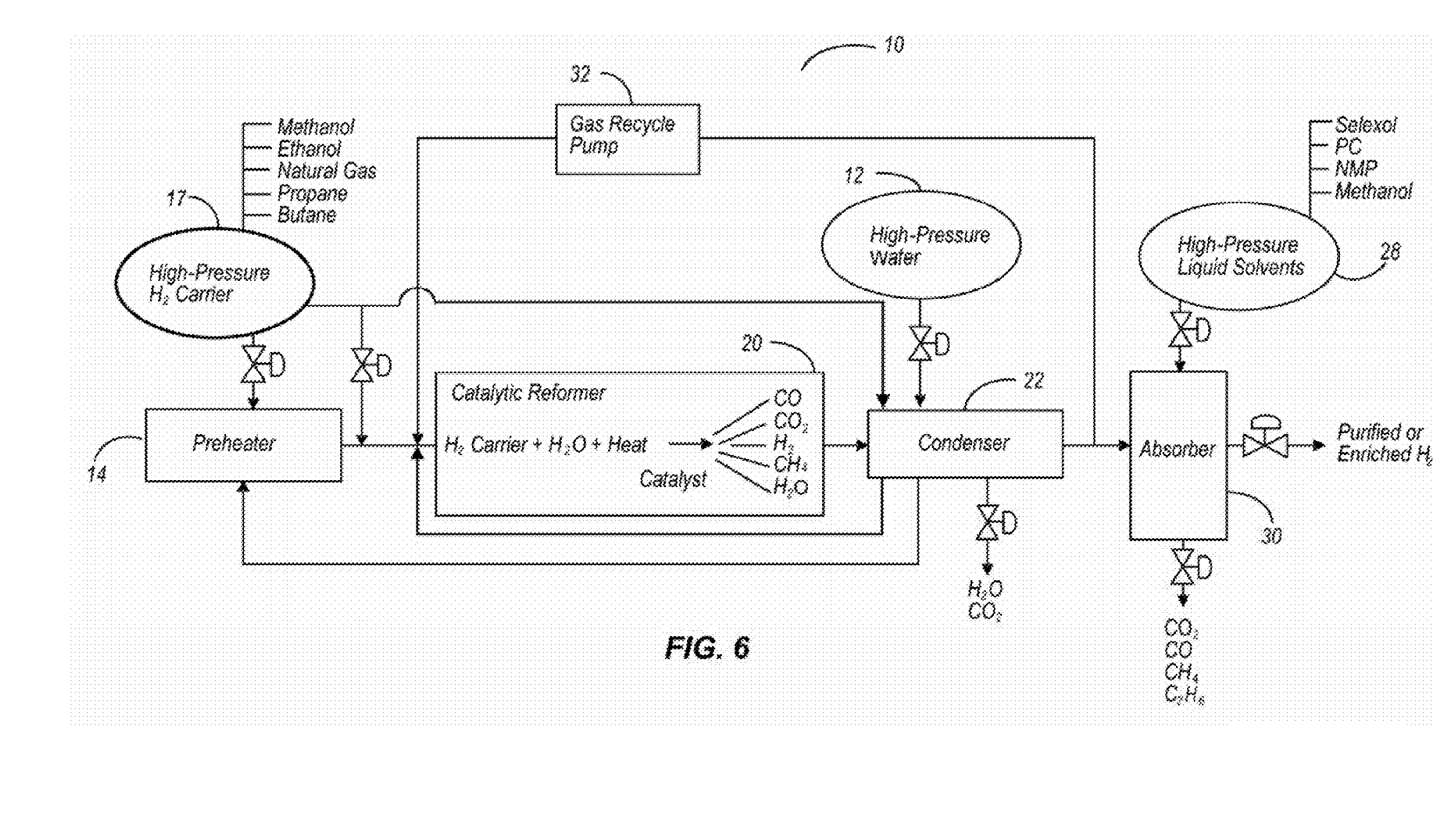
FIG. 6 is a schematic diagram of a reactor system utilizing direct hydrogen carrier injection into the catalytic reformer with high-pressure water, product gas recirculation, integrated solvent extraction hydrogen purification system, and heat recovery water condenser.

FIG. 6 presents another embodiment of the invention that utilizes liquid solvent to extract contaminant gases that include, but are not limited to, carbon dioxide, carbon monoxide, methane, and ethane. Direct hydrogen carrier addition into the catalytic reformer and product gas recycle has been added to the method. In this example, high-pressure water 12 is used to recover heat from condenser 22 by condensing water exiting the catalytic reformer 20. In an alternative arrangement, the hydrogen carrier 17 can be used to recover heat from condenser 22, bypassing preheater 14 and entering into the catalytic reformer 20 directly. The high-pressure water 12 is passed through the condenser 22 or, alternatively, the preheater 14 to increase the temperature to 380°-650° C. and a pressure from 2000 to 12,000 psi. Unlike FIG. 1, 2, or 3, this configuration allows water-soluble or water-insoluble hydrogen carriers 17 to be mixed inside the catalytic reformer without passing through the preheater 14. This configuration prevents coking of hydrogen carriers within the preheater and increases carrier conversion to pure hydrogen. Product gases exiting the condenser 22 then enter a liquid solvent absorber 30 to enrich the product stream with hydrogen. The enriched hydrogen gases can be used for blending feedstocks or further purified, if necessary, for PEM fuel cells.

Additionally, as exemplified in FIG. 6, part of the gas leaving the condenser 22 can be diverted back to the catalytic reformer 20 using gas recycle pump 32. The purpose of the recycle stream is to improve conversion of the hydrogen carrier in the catalytic reformer 20 by optimizing residence time within the reactor. By changing gas recycle rates, the reactor space velocity can be maintained while decreasing high-pressure water feed rates. As an example, superficial gas space velocities (SGSV) of at least 50 l/hr, most preferably 200 l/hr or greater, are required to improve hydrogen conversion under typical pressure, temperature, and hydrogen carrier conditions of the method. One way to accomplish this is to make catalytic reformer 20 with a large length-to-diameter (L/D) ratio, thus increasing the SGSV by reducing cross-sectional area. This geometry also facilitates heat transfer to overcome the endothermic reactions in the catalytic reformer 20. In the same example, an L/D ratio of 200 provided sufficient heat-transfer area for energy needs while maintaining high hydrogen carrier conversion. Alternatively, higher energy fluxes to the reactor may allow smaller L/D ratios, such as an L/D ratio of 50, provided reactor strength is not compromised.

In addition to higher heat fluxes, in another embodiment, an oxygen carrier may be delivered to the reactor in liquid form in order to partially oxidize a portion of the hydrogen carrier to provide thermal energy to the interior of catalytic reformer 20. This energy reduces the requirement for externally applied heat to drive the catalytic reforming of the hydrogen carrier to hydrogen. In this case, a reactor using a smaller L/D may be adequate for hydrogen conversion. As an example, hydrogen peroxide, carbon dioxide, oxygen, or a combination thereof may be delivered as a mixture with the high-pressure water 12 as an oxygen carrier. An added benefit of using an oxygen carrier is to promote the conversion of difficult-to-reform hydrocarbons such as kerosene. As an illustration, the optional oxygen carrier may be mixed with the high-pressure water 12 in FIGS. 1, 2, 3, and 6.

Physical solvent extraction lends itself to conditions where the operating pressures are high and requires less energy for regeneration than solvents utilizing chemical reactions. Unlike FIGS. 1, 2, and 3, FIG. 6 connects an absorber 30 to the condenser 22 with or without a control valve. The absorber 30 is then connected to high-pressure liquid solvents 28 via a control valve. This solvent extraction method at pressures exceeding 2000 psi is novel for hydrogen purification and carbon dioxide capture and sequestration. Commercial examples utilizing solvent extraction include the Selexol, Purisol, and Rectisol processes. Solvents used in these processes and others include normal methylpyrrolidone (NMP), methanol, polypropylene carbonate (PC), tributyl phosphate (TBP), and Selexol. Other solvents relying on chemical absorption to accomplish hydrogen purification or carbon dioxide capture and sequestration may also be used. Additionally, more efficient solvents may be found or tailored to perform at high pressures utilized for the present invention.

Figure 7:
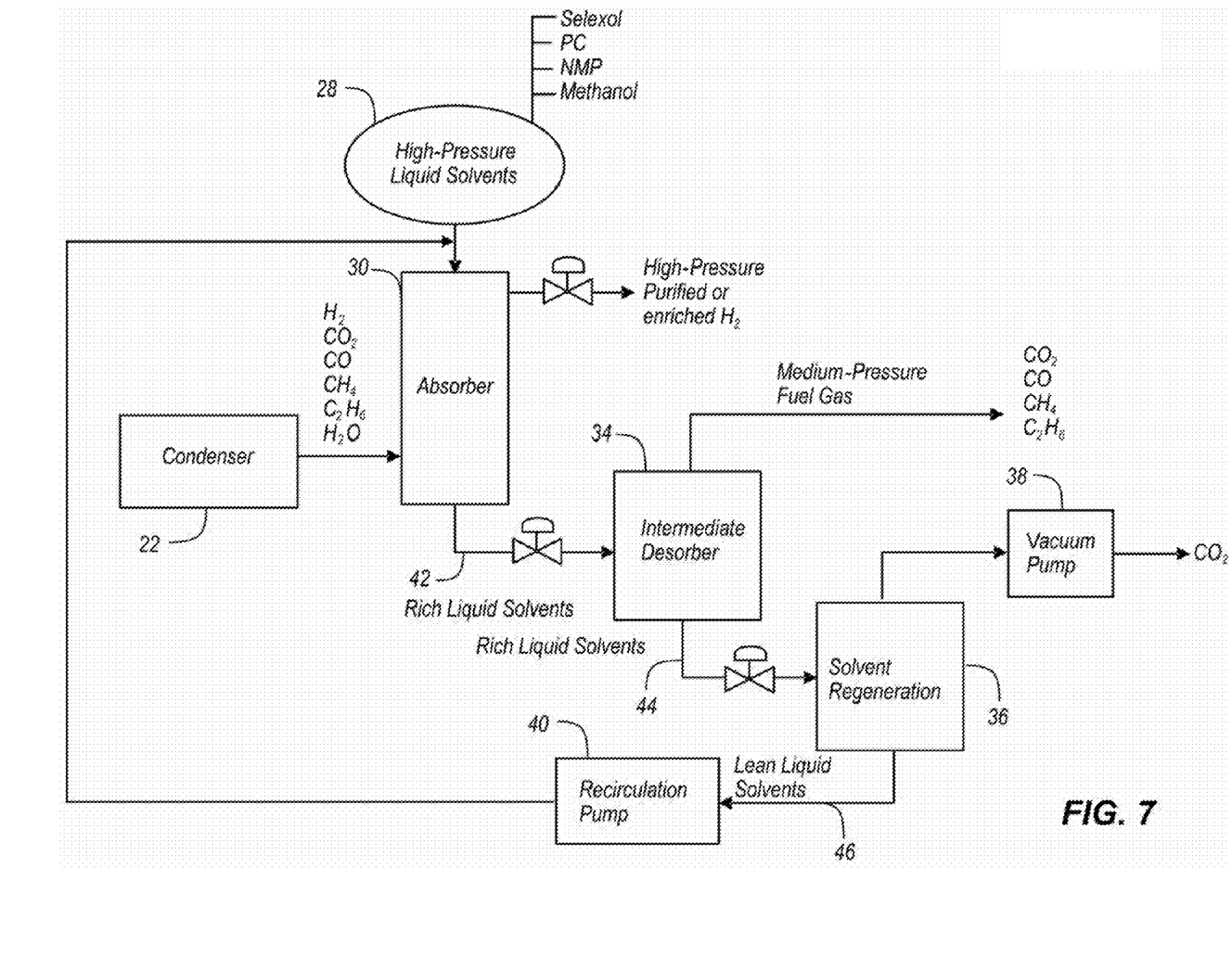
FIG. 7 is a detailed schematic diagram of an integrated liquid solvent-based hydrogen purification system at high pressure, exemplifying single or multiple stages of gas purification.

FIG. 7. illustrates a design for enriching $H_2$ produced using the high-pressure liquid solvents as illustrated in FIG. 6. Product gases leaving condenser 22 are fed into a countercurrent high-pressure liquid extraction absorber 30 where contaminant gases are physically or chemically absorbed into a liquid solvent, derived from the high-pressure liquid solvents 28. High-pressure liquid solvents 28 may include, but are not limited to, Selexol, PC, NMP, methanol, or a combination thereof of multiple absorbers as shown. Purified or enriched $H_2$ leaves the absorber 30 via a control valve for high-pressure utilization. Rich liquid solvents 42, rich in absorbed gases, are flashed at an intermediate pressure of 1000-11,000 psi in the intermediate desorber 34 to release fuel-rich components including, but not limited to, methane, ethane, and carbon monoxide for utilization as ICE-grade fuel gas or utilized for heat recovery or heat source process demands. The rich liquid solvents 44 are then flashed into the solvent regeneration 36 vessel at atmospheric pressure or under a vacuum using vacuum pump 38 to release the remaining absorbed constituents. The primary constituent of the solvent regeneration gas stream—being $CO_2$—can be utilized or sequestered. The now lean liquid solvent 46 can be recirculated via high-pressure recirculation pump 40 to the absorber 30 for reuse.

The method and apparatus presented in FIG. 7 support the method of on-demand hydrogen production by avoiding the use of compressors and sustaining $H_2$ delivery pressure utilizing low-energy-consuming liquid pumps. Hydrogen carriers or process variations may necessitate changes in solvent, operating configuration, and pressure and temperature ranges as well as gas recovery composition. FIG. 7 provides only one example of potentially numerous configurations. For example, multiple absorbers utilizing different solvents may be added to the method and apparatus comprising a multi-stage gas purification system. Each stage of solvent or solvents may selectively remove a contaminant gas. In other words, the configuration presented in FIG. 7 may be used multiple times in order to remove contaminant gases.

In another embodiment, as an alternative to liquid extraction, or used in conjunction with liquid extraction, pressure swing adsorption (PSA), temperature swing adsorption (TSA), and electrical swing adsorption (ESA) may be utilized for high-purity hydrogen necessary for PEM fuel cells. When used in conjunction with the present invention, the contaminant capture capacity of solid adsorbents may be greatly enhanced because of the high-pressure hydrogen delivery method. Examples of such adsorbents include, but are not limited to, molecular sieves, silica gel, activated carbon, activated alumina, or combinations thereof. Solid adsorption processes suffer from large energy requirements needed to regenerate the sorbents. This energy penalty manifests itself in pressure cycling (PSA) and/or temperature cycling (TSA) to desorb contaminant gases from the surface of the adsorbents. For example, if the capacity of the adsorbent is large and the sorbent can be greatly densified to minimize voidage within the containment vessel, then the penalty for repressurization can be minimized. Normally, this approach would not be practical because of the large potential pressure drop across the adsorbent column; however, at very high pressures (2000-12000 psi), the velocities through the column can be made very small. Thus integrating such gas purification methods into this invention may result in improved performance.

In another embodiment, the contaminants can be adsorbed at high pressure, for example, 12,000 psi, and then desorbed at a lower pressure, 6500 psi. This allows for pressure cycling without lowering the final pressure below the dispensing pressure, such as 6000 psi. The contaminant desorption process may also be augmented with the use of heat to facilitate the release of contaminant gases.

Figure 8:
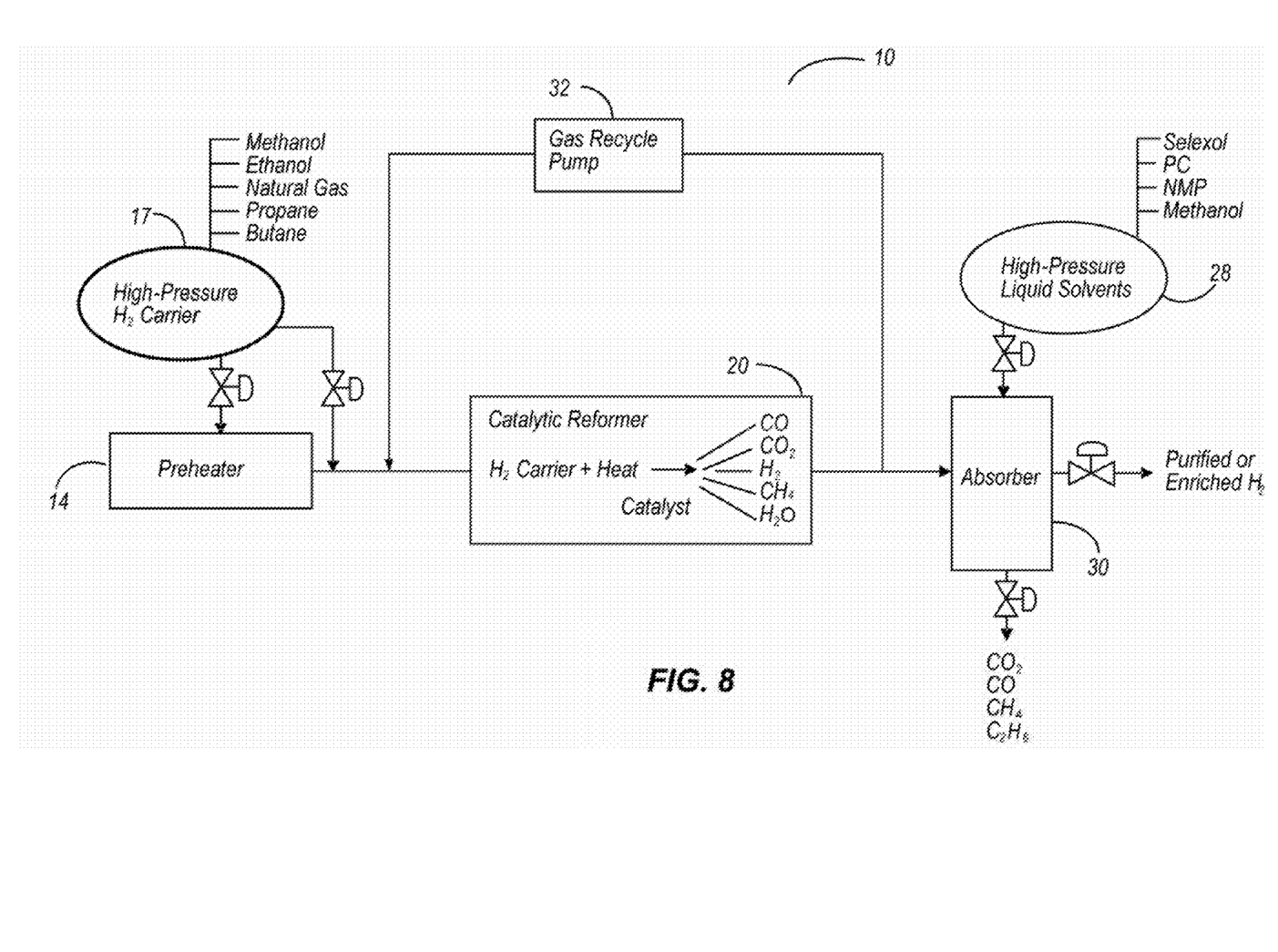
FIG. 8 is a schematic diagram of a reactor system utilizing direct hydrogen carrier injection into the catalytic reformer without high-pressure water, product gas recirculation, integrated solvent extraction hydrogen purification system, and heat recovery water condenser.

Unlike FIGS. 1, 2, and 6, FIG. 8 provides an example of the present invention utilizing the direct injection of the hydrogen carrier 17 into the catalytic reformer 20 without the use of high-pressure water. In FIG. 8, the catalytic reformer will produce hydrogen but will favor carbon monoxide formation over carbon dioxide. The advantage to operating the invention in this manner would be to reduce energy requirements and overall complexity as a result of eliminating water as a reactant. The reduced complexity includes high-pressure water pumping, water heating, and postcatalytic reactor water condensation and removal. In addition, solvents used in absorber 30 for hydrogen purification need to be selective for carbon monoxide capture. Solvents may include, but are not limited to, alcohols and acetic acid. Captured carbon monoxide can be utilized for heat recovery or reacted in a water-gas shift reactor located downstream of the catalytic reformer to produce hydrogen.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative, rather than a restrictive, sense.

What is claimed is:

1. A method of producing high-pressure hydrogen on-demand comprising:
    pressurizing a hydrogen carrier to at least 2000 psi to eliminate or reduce the need for mechanical compression of gas;
    pressurizing water to at least 2000 psi;
    placing the pressurized hydrogen carrier and the pressurized water into a catalytic reformer, wherein the hydrogen carrier and the pressurized water are exposed to a catalyst in the catalytic reformer; and
    creating a reformer output gas.

2. The method of claim 1, wherein the hydrogen carrier is natural gas.

3. The method of claim 1, wherein the hydrogen carrier is methane.

4. The method of claim 1, wherein the hydrogen carrier is ethanol, methanol, butanol, other alcohols, or combinations thereof.

5. The method of claim 1, wherein the hydrogen carrier is propane.

6. The method of claim 1, wherein the hydrogen carrier is butane.

7. The method of claim 1, wherein the hydrogen carrier is naphtha or gasoline.

8. The method of claim 1, wherein the hydrogen carrier is ammonia, urea, carbonate, ammonium bicarbonate, or combinations thereof.

9. The method of claim 1, wherein the hydrogen carrier is military-specification turbine fuel, commercial turbine fuel, diesel fuel, kerosene, fuel oil, or combinations thereof.

10. The method of claim 1, wherein the hydrogen carrier is natural gas condensate liquids or natural gasoline.

11. The method of claim 1, wherein the hydrogen carrier is glycerol.

12. The method of claim 1, further comprising maintaining a pressure in the catalytic reformer to be greater than 3200 psi.

13. The method of claim 1, further comprising maintaining a temperature in the catalytic reformer in the range of 375° to 640° C.

14. The method of claim 1, further comprising:
maintaining a pressure in the catalytic reformer in the range of 2000 to 12,000 psi; and
maintaining a temperature in the catalytic reformer in the range of 375° to 640° C.

15. The method of claim 1, further comprising separating hydrogen from the reformer output gas.

16. The method of claim 15, wherein carbon dioxide and water are separated from hydrogen using a condenser.

17. The method of claim 1, wherein carbon dioxide is separated and recovered for sequestration or other utilization options.

18. The method of claim 1, further comprising using produced hydrogen to power a fuel cell.

19. The method of claim 14, wherein the hydrogen carrier is preheated to the temperature in the catalytic reformer.

20. The method of claim 1, wherein the hydrogen carrier is injected directly into the catalytic reformer.

21. The method of claim 15, wherein the reformer output gas is recycled by a gas recycle pump and injected directly into the catalytic reformer.

22. The method of claim 15, wherein the reformer output gas includes, but is not limited to, hydrogen, carbon dioxide, carbon monoxide, methane, ethane, propane, or a combination thereof.

23. The method of claim 15 wherein the reformer output gas is separated and recovered using liquid extraction, condensation, or solid sorption for sequestration or other utilization option such as a fuel gas for heat recovery, heat-source process demands, or internal combustion engines.

24. The method of claim 1, wherein the catalytic reformer has a minimum superficial gas space velocities of 50 l/hr.

25. The method of claim 1, wherein the catalytic reformer has a minimum length-to-diameter ratio of 50.

26. The method of claim 1, further comprising the use of an oxygen carrier in the high-pressure water feed.

27. The method of claim 26, wherein the oxygen carriers include, but are not limited to, hydrogen peroxide, carbon dioxide, oxygen, or a combination thereof.

28. The method of claim 15, wherein the hydrogen is separated from the reformer output gas via solid adsorbents.

29. The method of claim 28, wherein the solid adsorbents are molecular sieves, silica gel, activated carbon, activated alumina, or combinations thereof.

30. The method of claim 15, wherein reformer output gases are removed from the hydrogen-containing gas by a densified solid adsorbent.

31. The method of claim 28, wherein the solid adsorbents are regenerated by cycling pressure from the hydrogen production pressure to a lower dispensing pressure.

32. A method of producing high-pressure hydrogen on-demand comprising:
pressurizing a hydrogen carrier to at least 2000 psi to eliminate or reduce the need for mechanical compression of gas;
placing the pressurized hydrogen carrier into a catalytic reformer, wherein the hydrogen carrier is exposed to a catalyst in the catalytic reformer; and
creating a reformer output gas.

33. The method of claim 32, wherein the hydrogen carrier is methanol or another alcohol.

34. The method of claim 32, wherein the hydrogen carrier is glycerol.

35. The method of claim 32, wherein the hydrogen carrier is ammonia, urea, carbonate, ammonium bicarbonate, or combinations thereof.

36. The method of claim 32, further comprising maintaining a pressure in the catalytic reformer to be greater than 3200 psi.

37. The method of claim 32, further comprising maintaining a temperature in the catalytic reformer in the range of 100° to 640° C.

38. The method of claim 32, further comprising:
maintaining a pressure in the catalytic reformer in the range of 2000 to 12,000 psi and
maintaining a temperature in the catalytic reformer in the range of 100° to 640° C.

39. The method of claim 38, wherein the temperature in the catalytic reformer is based on the decomposition temperature of the hydrogen carrier to prevent carbon formation.

40. The method of claim 32, wherein the hydrogen is separated from the reformer output gas.

41. The method of claim 32, wherein the reformer output gas includes, but is not limited to hydrogen, carbon dioxide, carbon monoxide, methane, ethane, propane, or a combination thereof.

42. The method of claim 40, wherein the reformer output gases are separated from hydrogen using a condenser.

43. The method of claim 40, wherein carbon dioxide is separated and recovered for sequestration or other utilization options.

44. The method of claim 40, wherein carbon monoxide is separated and recovered for further utilization.

45. The method of claim 44, wherein captured carbon monoxide is passed through a water-gas shift reactor to improve hydrogen yield.

46. The method of claim 32, further comprising using produced hydrogen to power a fuel cell.

47. The method of claim 38, wherein the hydrogen carrier is preheated to the temperature in the catalytic reformer.

48. The method of claim 32, wherein the reformer output gases are recycled by a gas recycle pump and injected directly into the catalytic reformer.

49. The method of claim 32, wherein the reformer output gases are separated and recovered using liquid extraction, condensation, or solid sorption for sequestration or other utilization option such as a fuel gas for heat recovery, heat-source process demands, or internal combustion engines.

50. The method of claim 32, wherein the catalytic reformer has a minimum superficial gas space velocities of 50 l/hr.

51. The method of claim 32, wherein the catalytic reformer has a minimum length-to-diameter ratio of 50.

52. The method of claim 32, further comprising the use of an oxygen carrier in the high-pressure water feed.

53. The method of claim 52, wherein the oxygen carriers are hydrogen peroxide, carbon dioxide, oxygen, or a combination thereof.

54. The method of claim 32, wherein the hydrogen is separated from the reformer output gas via solid adsorbents.

55. The method of claim 54, wherein the solid adsorbents are molecular sieves, silica gel, activated carbon, activated alumina, or combinations thereof.

56. The method of claim 32, wherein the hydrogen is separated from the reformer output gas by a densified solid adsorbent.

57. The method of claim 54, wherein a solid adsorbent is regenerated by cycling pressure from the hydrogen production pressure to a lower dispensing pressure.

* * * * *